United States Patent
Guo et al.

(10) Patent No.: US 11,537,029 B2
(45) Date of Patent: Dec. 27, 2022

(54) GIMBAL HANDLE AND GIMBAL HAVING SAME

(71) Applicant: SZ DJI TECHNOLOGY CO., LTD., Shenzhen (CN)

(72) Inventors: Shengjia Guo, Shenzhen (CN); Dexi Li, Shenzhen (CN); Guisheng Nong, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 14 days.

(21) Appl. No.: 17/125,229

(22) Filed: Dec. 17, 2020

(65) Prior Publication Data

US 2021/0103207 A1 Apr. 8, 2021

Related U.S. Application Data

(63) Continuation of application No. PCT/CN2018/093846, filed on Jun. 29, 2018.

(51) Int. Cl.
| | |
|---|---|
| *G03B 17/56* | (2021.01) |
| *F16M 13/04* | (2006.01) |
| *F16M 11/10* | (2006.01) |
| *F16M 11/20* | (2006.01) |
| *G06F 3/14* | (2006.01) |

(52) U.S. Cl.
CPC .......... *G03B 17/561* (2013.01); *F16M 13/04* (2013.01); *F16M 11/10* (2013.01); *F16M 11/2014* (2013.01); *F16M 11/2071* (2013.01); *G06F 3/14* (2013.01)

(58) Field of Classification Search
USPC ......................................................... 396/428
See application file for complete search history.

(56) References Cited

U.S. PATENT DOCUMENTS

| | | | |
|---|---|---|---|
| 8,142,083 B2 * | 3/2012 | Brown ............... | F16M 11/2035 396/421 |
| 8,585,205 B2 * | 11/2013 | Greaves ................. | G03B 17/00 396/421 |
| 8,714,744 B2 * | 5/2014 | Greaves ............... | F16M 11/123 396/428 |

(Continued)

FOREIGN PATENT DOCUMENTS

| | | |
|---|---|---|
| CN | 201795240 U | 4/2011 |
| CN | 106090579 A | 11/2016 |

(Continued)

OTHER PUBLICATIONS

The World Intellectual Property Organization (WIPO) International Search Report for PCT/CN2018/093846 dated Sep. 30, 2018 6 pages.

*Primary Examiner* — Clayton E. LaBalle
*Assistant Examiner* — Warren K Fenwick
(74) *Attorney, Agent, or Firm* — Anova Law Group, PLLC

(57) ABSTRACT

A gimbal handle includes an enclosure including an accommodation space, a main control board accommodated in the accommodation space, and an electrical contact member provided at the main control board and electrically connected to the main control board. The electrical contact member penetrates the enclosure to expose to an outside of the enclosure. The electrical contact member is configured to be electrically connected to an adapter.

20 Claims, 6 Drawing Sheets

(56) References Cited

U.S. PATENT DOCUMENTS

| | | | | |
|---|---|---|---|---|
| 9,030,149 B1* | 5/2015 | Chen | ...................... | F16M 11/42 |
| | | | | 318/648 |
| 2008/0046122 A1* | 2/2008 | Manzo | ................... | A61B 90/98 |
| | | | | 700/245 |
| 2013/0259436 A1 | 10/2013 | Tanabe et al. | | |
| 2013/0259463 A1 | 10/2013 | Dybowski | | |
| 2016/0290556 A1* | 10/2016 | Choi | .................... | G01C 21/265 |
| 2016/0334638 A1* | 11/2016 | Wagner | ................. | F16M 13/00 |
| 2017/0301230 A1 | 10/2017 | Liu et al. | | |
| 2018/0023752 A1* | 1/2018 | Tian | ....................... | F16M 13/00 |
| | | | | 348/376 |

FOREIGN PATENT DOCUMENTS

| | | | | |
|---|---|---|---|---|
| CN | 107255901 A | 10/2017 | | |
| CN | 207200802 U | 4/2018 | | |
| CN | 207394316 U | 5/2018 | | |
| WO | WO-2011059526 A1 * | 5/2011 | ............ | F16M 11/04 |
| WO | 2017116919 A1 | 7/2017 | | |

* cited by examiner

GIMBAL HANDLE AND GIMBAL HAVING SAME

CROSS-REFERENCE TO RELATED APPLICATION

This application is a continuation of International Application No. PCT/CN2018/093846, filed on Jun. 29, 2018, the entire content of which is incorporated herein by reference.

TECHNICAL FIELD

The present disclosure relates to the technical field of gimbals and, more particularly, to a gimbal handle and a gimbal having the same.

BACKGROUND

With the advancement of gimbal technologies, users demand more and more about gimbals. For example, a communication connection may be established between a gimbal and a terminal (mainly referring to a mobile terminal), to facilitate viewing images obtained through the gimbal in real time or storing the images obtained through the gimbal in real time. Currently, wires are often coming out from inside of the gimbal and are connected to the terminal to establish the communication connection between the gimbal and the terminal. This implementation is cumbersome. Moreover, the wires easily get tangled, causing inconvenience. In addition, the wires also degrade the aesthetic aspect of the related products.

SUMMARY

In accordance with the disclosure, there is provided a gimbal handle. The gimbal handle includes an enclosure including an accommodation space, a main control board accommodated in the accommodation space, and an electrical contact member provided at the main control board and electrically connected to the main control board. The electrical contact member penetrates the enclosure to expose to an outside of the enclosure. The electrical contact member is configured to be electrically connected to an adapter.

Also in accordance with the disclosure, there is provided a gimbal. The gimbal includes an arm, an electric motor configured to drive the arm to rotate, a photographing device mounted at the arm, an adapter configured to be connected to a terminal, and a gimbal handle including an enclosure including an accommodation space, a main control board accommodated in the accommodation space, and an electrical contact member provided at the main control board and electrically connected to the main control board, the electrical contact member penetrating the enclosure to expose to an outside of the enclosure. The arm or the electric motor is fixed to the enclosure. The adapter is electrically connected to the electrical contact member.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

REFERENCE NUMERALS

Figure 1:
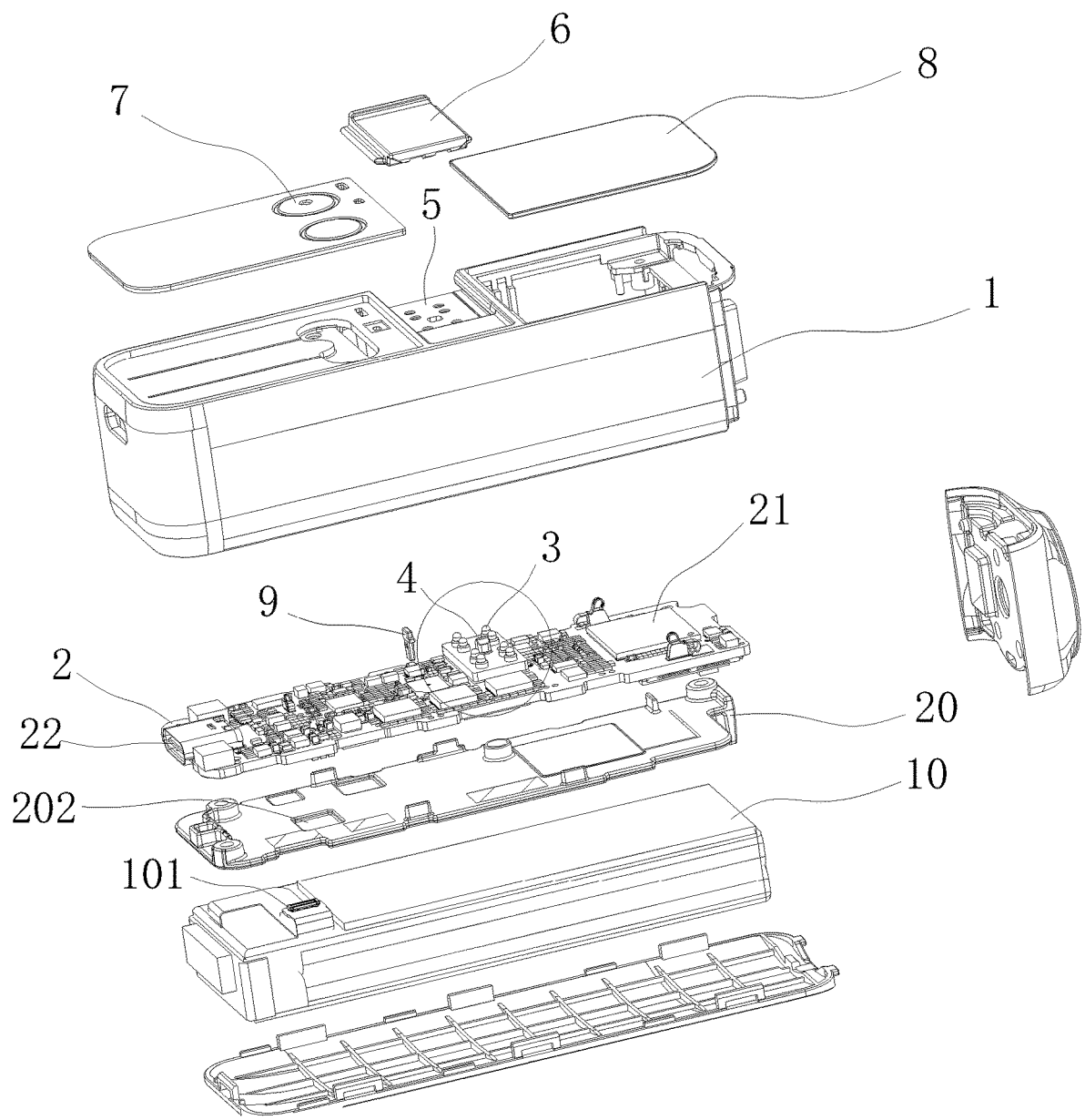
FIG. 1 is an exploded view of a gimbal handle according to an example embodiment of the present disclosure.

100: arm
200: electric motor
300: photographing device
400: gimbal handle
1: enclosure
11: front part
12: rear part
13: top cover
131: wiring hole
2: main control board
3: electrical contact member
4: connection member
5: slot
51: opening
52: limit member
6: cover plate
7: controller
71: shutter button
72: power button
8: display screen
9: indicator
10: power supply battery
101: plug-in member
20: heat sink
201: avoidance slot
202: heat conduction member
30: card slot

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

The gimbal handle and the gimbal thereof consistent with the present disclosure will be described in detail below with reference to the accompanying drawings. In the case of no conflict, the following embodiments and features in the implementation can be combined with each other.

FIG. 1 is an exploded view of a gimbal handle 400 according to an example embodiment of the present disclosure. The gimbal handle 400 includes an enclosure 1, a main control board 2, and an electrical contact member 3. The enclosure 1 includes an accommodation space (not shown). The main control board 2 is accommodated inside the accommodation space. The electrical contact member 3 is provided at the main control board 2 and is electrically connected to the main control board 2. The electrical contact member 3 penetrates the enclosure 1 and is exposed to the outside of the enclosure 1. The electrical contact member 3 can be used to be electrically connected to an adapter. In some embodiments, the adapter is used to be connected to the terminal, thereby establishing a communication connection between the gimbal and the terminal. In some embodiments, being provided at the enclosure 1, the electrical contact member 3 is able to be electrically connected to the adapter. The communication connection between the gimbal and the terminal (mainly referring to mobile terminal such as a smart phone) can be realized via a simple structure. The connection is established conveniently and quickly without cumbersome entanglement of peripheral wires, and the resulting product looks aesthetically appealing.

The electrical connection between the electrical contact member 3 and the main control board 2 may be achieved by a manner in the following example. The main control board 2 may include a main control chip (MCU), a peripheral driving circuit provided adjacent to the MCU, and a connector terminal electrically connected to the MCU. The electrical contact member 3 is directly electrically connected to the connector terminal. In some embodiments, the electrical contact member 3 is electrically connected to the connector terminal through wires.

In one embodiment, the main control board 2 includes a detection circuit. The electrical contact member 3 may include a first electrical contact member 3 and a second electrical contact member 3. The first electrical contact member 3 is electrically connected to the adapter. The second electrical contact member 3 is connected to the detection circuit. In some embodiments, when the first electrical contact member 3 is able to be electrically connected to the adapter, the detection circuit detects a conduction signal. In one feasible implementation example, the conduction signal is a high-level signal. The first electrical contact member 3 and the second electrical contact member 3 are electrically connected. The detection circuit includes a resistor connected to the ground. One end of the resistor away from the ground is connected to the second electrical contact member 3. One end of the second electrical contact member 3 away from the resistor is connected to the first electrical contact member 3, and becomes an output terminal of the detection circuit. When the first electrical contact member 3 is electrically connected to the adapter, because the adapter outputs +5V to pull up the voltages at both ends of the resistor, the detection circuit outputs the high-level signal.

The type of the electrical contact member 3 may be selected as required. For example, the electrical contact member 3 may be selected to include retractable pins, an electrical connector interface, or an electrical contact. In some embodiments, the electrical contact member 3 include the retractable pins. The retractable pins may be stably connected to the adapter to improve the stability of the communication. Optionally, referring to FIG. 2, the retractable pins include eight pins. Four pins are arranged in an array to form the first electrical contact member 3 and another four pins are arranged in another array to form the second electrical contact member 3. It should be understood that, in other embodiments, the number of retractable pins, the pin arrangement, and the function may be configured as required.

Figure 2:
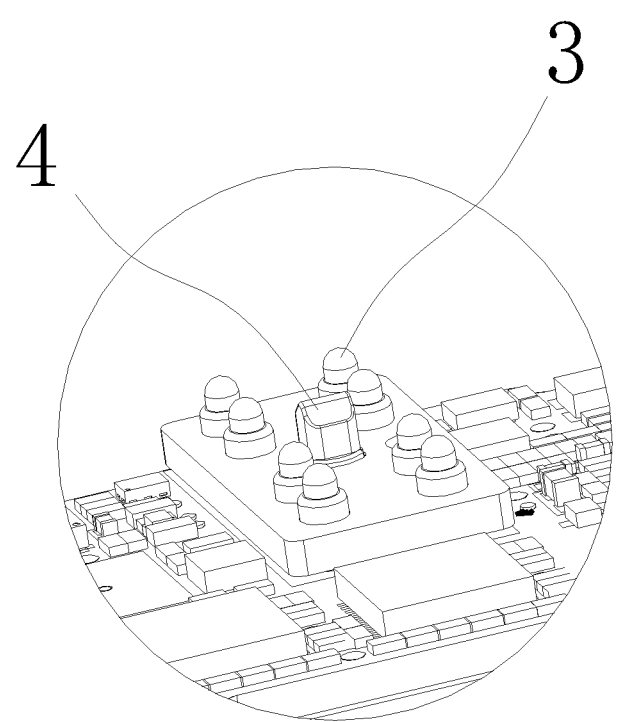
FIG. 2 is a partial enlarged view of FIG. 1.

Referring to FIG. 1 and FIG. 2, the gimbal handle 400 also includes a connection member 4 provided at the main control board 2. The connection member 4 penetrates the enclosure 1 and is exposed to the outside of the enclosure 1. The connection member 4 may be detachably connected to the adapter to fix the adapter to the enclosure 1. Thus, the terminal is fixed to the enclosure 1. The enclosure 1 may function as a base of the terminal. When the gimbal is used for photographing, a user may view the images photographed by the gimbal through the terminal.

The connection member 4 may include an elastic connection member, a clamping connection member, or other types of connection members. In some embodiments, the connection member 4 includes the elastic connection member. The elastic connection member and the adapter are plug-in fitted. The adapter can be conveniently fixed to the enclosure 1.

Further, the electrical contact member 3 of the embodiments of the present disclosure may include multiple electrical contact members. Optionally, one part of the multiple electrical contact members 3 may have a function different from another part of the multiple electrical contact members 3. For example, in the above embodiments, the first electrical contact member 3 and the second electrical contact member 3 have different functions. Optionally, the multiple electrical contact members 3 have the same function. In some embodiments, the multiple electrical contact members 3 are distributed around the connection member 4. For example, based on the functions of the electrical contact members 3, the multiple electrical contact members 3 are arranged around the connection member 4. For example, in some embodiments, the electrical contact members 3 include the first electrical contact member 3 and the second electrical contact member 3. The first electrical contact member 3 and the second electrical contact member 3 are arranged on two opposite sides of the connection member 4.

Figure 5:
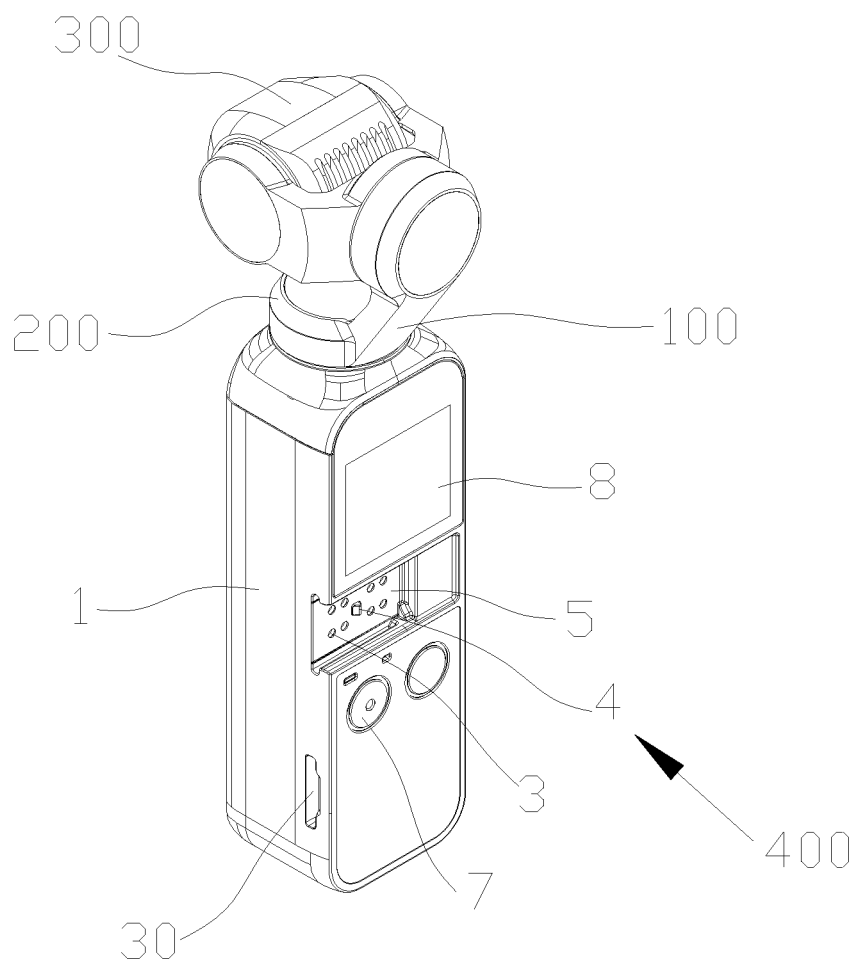
FIG. 5 is a perspective view of a gimbal according to an example embodiment of the present disclosure.
Figure 6:
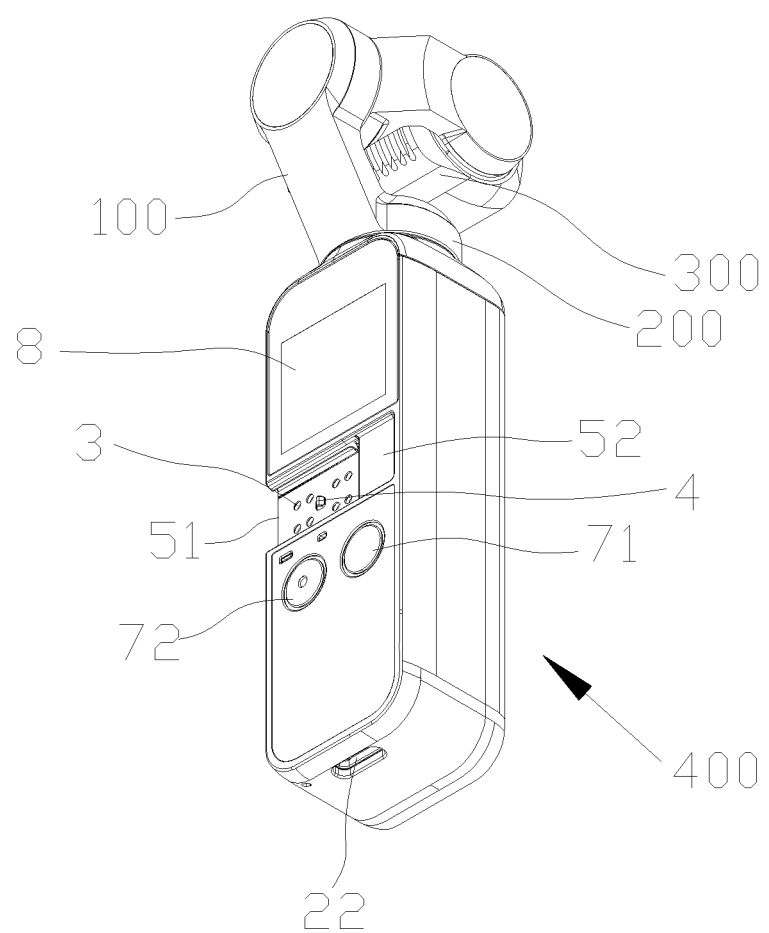
FIG. 6 is a perspective view of a gimbal from a different angle according to an example embodiment of the present disclosure.

In addition, referring to FIG. 1, FIG. 5, and FIG. 6, a slot 5 is provided at an outer surface of the enclosure 1. The electrical contact member 3 and the connection member 4 are both inserted in and accommodated inside the slot 5. The slot 5 is used to be detachably connected to the adapter. The adapter may be fixed further through the slot 5, such that the adapter may be more securely fixed to the enclosure 1.

Specifically, referring to FIG. 6, the slot 5 includes an opening 51 and a limit member 52 provided opposite to the opening 51. The adapter moves from the opening 51 to the limit member 52 to be electrically connected to the electrical contact member 3 and fixedly connect to the connection member 4. The limit member 52 is used to limit a movement of the adapter relative to the slot 5. In some embodiments, after the adapter is inserted in the slot 5 from the opening 51, the adapter slides along both sides of the slot 5 to move to the limit member 52. It should be understood that the present disclosure does not specifically limit the opening direction of the opening 51. The opening 51 may open toward the left r toward the right. In this case, the "left" and "right" are based on the surface of the enclosure 1 where the slot 5 is located as the front side, and the end of the enclosure 1 connecting to the gimbal as the "up".

In some embodiments, referring to FIG. 5 and FIG. 6, the four retractable pins adjacent to the limit member 52 form the first electrical contact member 3, and the other four retractable pins away from the limit member 52 form the second electrical contact member 3. The adapter includes a first end and a second end connected to the terminal. Moreover, the end of the adapter adjacent to the first end is provided with a third electrical contact member 3. When in use, after the first end of the adapter is inserted in the slot 5 from the opening 51, the adapter slides along both sides of the slot 5 and moves to the limit member 52, such that the third electrical contact member 3 is electrically connected to the first electrical contact member 3. Further, the second end protrudes from the enclosure 1 to facilitate the connection to the terminal. While not in use, the adapter may be accommodated inside the slot 5. The first end is aligned with the opening 51, such that the third electrical contact member 3 is connected (mechanically connected) to the second electrical contact member. The second end is matched with the limit member 52.

Figure 3:
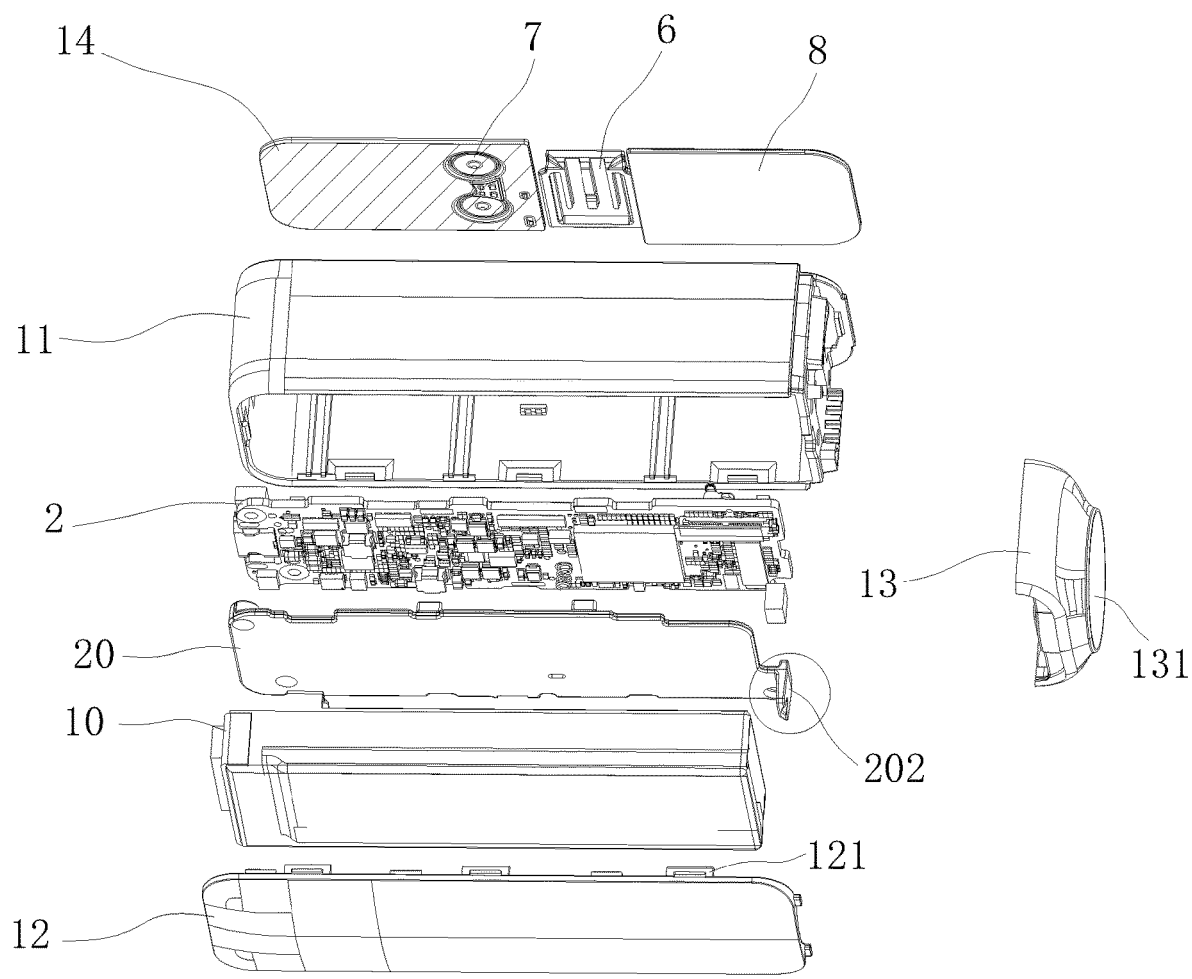
FIG. 3 is an exploded view of a gimbal handle from a different angle according to an example embodiment of the present disclosure.
Figure 4:
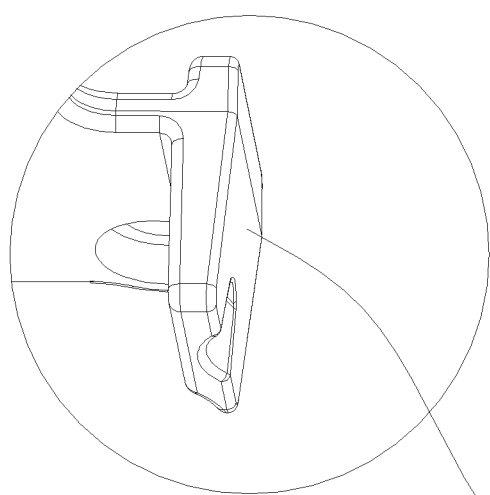
FIG. 4 is a partial enlarged view of FIG. 3.

With further reference to FIG. 1 and FIG. 3, the gimbal handle 400 also includes a cover plate 6. The cover plate 6 is used to cover the slot 5. When not in use, the cover plate 6 covers the slot 5 to prevent dust and moisture, etc. from entering the electrical contact member 3 to cause damage to the electrical contact member 3. When in use, the cover plate 6 opens. Optionally, the cover plate 6 is detachably connected to the enclosure 1. When in use, the cover plate and the enclosure 1 may be separated. In some embodiments, the cover plate 6 may be rotatably connected to the enclosure 1. Rotating the cover plate 6 makes the cover plate 6 open and close. When the cover plate 6 is not in use, the cover plate 6 is also connected to the enclosure 1, thereby avoiding being lost.

Referring to FIG. 1, the gimbal handle 400 also includes a display screen 8 provided at the enclosure 1. The main control board 2 includes a display driving circuit. The display driving circuit is electrically connected to the display screen 8. The images photographed by the gimbal may be viewed directly on the display screen 8. It is not only convenient and quick, but also satisfies diverse needs of users. The display screen 8 may be an LCD display screen 8 or a display screen 8 of another type.

In one embodiment, the enclosure 1 includes a top part for connecting to a gimbal arm 100 or a gimbal electric motor 200, a bottom part provided opposite to the top part, and a front part (i.e., the front side of the enclosure 1) provided between the top part and the bottom part.

The electrical contact member 3, the connection member 4, and the display screen 8 are located at the front part to facilitate user operations. Moreover, the display screen 8 is provided adjacent to the top part. The electrical contact member 3 and the connection member 4 both are located at a side of the display screen 8 away from the top part. The electrical contact member 3, the connection member 4, and the display screen 8 are configured to match user habits.

Further, with reference to FIG. 1 and FIG. 5, the gimbal handle 400 also includes a controller 7 provided at the enclosure 1. The controller 7 is electrically connected to the main control board 2. In one embodiment, operating the controller 7 is able to control operations of the gimbal, such as controlling turn-on and turn-off of the gimbal, and controlling photographing of the gimbal camera, etc. The controller 7 may be a button (a virtual button or a physical button) or a knob. Referring to FIG. 6, the controller 7 may include a shutter button 71, a power button 72, and other control buttons, such as an electric motor 200 rotation control button, an image saving button, and an image playback control button, etc.

The controller 7 is also located at the front part. The controller 7 is provided adjacent to the bottom part. In one embodiment, with reference to FIG. 5 and FIG. 6, the electrical contact member 3 and the connection member 4 are located between the display screen 8 and the controller 7. That is, the electrical contact member 3 and the connection member 4 are located at a side of the controller 7 away from the bottom part.

In one embodiment, the side of the front of the enclosure 1 adjacent to the bottom part (specifically, an area between the bottom of the enclosure 1 and the slot 5) is selected to be made of a soft material, such as silica gel. When in use, the soft material makes the touch feel more comfortable, thereby improving user experience.

In addition, in one embodiment, the enclosure 1 also includes a side part. The gimbal handle 400 also includes a card slot 30 provided at the side part. The card slot 30 is electrically connected to the main control board 2. Inserting an SD card in the card slot 30 allows the images photographed by the gimbal to be stored in the SD card. Moreover, the card slot 30 is provided at the side without interfering the use of other functions. Thus, the user experience is desirable.

In some embodiments, the enclosure 1 may be assembled from multiple parts or may be an integral structure. For example, in one embodiment, the enclosure 1 includes a front part 11 and a rear part 12 coupled with the front part 11, and the front part 11 and the rear part 12 encloses to form the accommodation space. In another embodiment, the enclosure 1 includes a top part and a bottom part coupled with the top part, and top part and the bottom part enclose to form the accommodation space. For illustration purpose, in one embodiment, the enclosure 1 includes the front part 11 and the rear part 12. In this embodiment, the front part 11 and the rear part 12 may be detachably connected with each other. Moreover, a sealed structure may be provided at the junction of the front part 11 and the rear part 12 to prevent external debris from entering the accommodation space.

In one embodiment, the enclosure 1 may be used as a handheld member or may be mounted at a movable platform.

Further, the enclosure 1 also includes a top cover 13 (i.e., the top part) provided at the same side as the front part 11 and the rear part 12. The top cover 13 is used for the gimbal arm 100 or the gimbal electric motor 200 to be mounted thereto.

The top cover 13 is provided with a wiring hole 131. The wires drawn from the main control board 2 pass through the wiring hole 131 to be connected to the gimbal electric motor 200, such that the main control board 2 controls the rotation of the gimbal electric motor 200. In addition, after passing through the wiring hole 131, the wires drawn from the main control board 2 may also connect to a photographing device 300 mounted at the gimbal arm 100 to obtain and save the images photographed by the photographing device 300. After the main control board 2 obtains the images, the images may be played directly on the display screen 8 or may be transmitted to the terminal through the adapter, and the terminal may play and/or save the images. In addition, the main control board 2 may transmit the images to the SD card for storage.

Further, with reference to FIG. 1 and FIG. 3, the gimbal handle 400 also includes a power supply battery 10 accommodated in the accommodation space. The power supply battery 10 is used to supply power to the main control board 2. In one embodiment, the power supply battery 10 is provided between the main control board 2 and the rear part 12, such that the electrical contact member 3 and the connection member 4 are exposed through the front part 11.

Referring to FIG. 3, a fixing member is provided at the periphery of the rear part 12. A side of the fixing member facing toward the accommodation space is fixedly connected to the power supply battery 10. Fixing the power supply battery by the fixing member prevents the power supply battery 10 from shaking inside the accommodation space. Moreover, the fixing member that fixes the front part 11 is selected to fix the power supply battery 10 so that no additional fixing structure is needed to fix the power supply battery 10 to the rear part 12 and the weight of the gimbal handle 400 is reduced. In one feasible implementation, the fixing member is a clamping member. The clamping member faces toward the accommodation space and clamps the power supply battery 10. The clamping member clamps the front part 11 on the side away from the accommodation space. As such, both the power supply battery 10 and the front part 11 are fixed to the rear part 12 through the clamping member. It should be understood that the type of the fixing member is not limited by the present disclosure.

The power supply battery 10 In some embodiments is a rechargeable battery. The rechargeable battery has a large capacity and a small size, thereby facilitating the miniaturization design of the gimbal handle 400.

With reference to FIG. 1 through FIG. 6, the main control board 2 also includes a charging interface. The charging interface is exposed at the bottom part, and the charging interface is electrically connected to the power supply battery 10. The power supply battery 10 may be connected to an external power supply through the charging interface, such that the power supply battery 10 is recharged.

Referring back to FIG. 1, the gimbal handle 400 also includes a heat sink 20 accommodated inside the accommodation space. The heat sink 20 is provided between the main control board 2 and the power supply battery 10, and the heat sink 20 directly contacts the enclosure 1. In one embodiment, one side of the heat sink 20 contacts electronic components on the main control board 2, and another side of the heat sink 20 contacts the power supply battery 10, such that the heat generated by the electronic components on the main control board 2 and the power supply battery 10 in operation is conducted to the outside of the enclosure 1. Thus, the heat dissipation is highly efficient.

In one embodiment, the heat sink 20 dissipates the heat generated by the main control board 2 and the power supply battery through heat conduction to the outside of the enclosure 1. Specifically, in one embodiment, the heat sink 20 includes a heat conduction member 202. The heat conduction member 202 contacts the top cover 13 to dissipate the heat from the inside of the accommodation space to the outside of the accommodation space through the top cover 13. The heat conduction member 202 is coupled with the top cover 13 to improve the heat dissipation efficiency.

The heat sink 20 extends in a same direction as the power supply battery 10 extends to maximize the contact area between the heat sink 20 and the power supply battery 10. As such, most heat generated by the power supply battery 10 is conducted to the heat conduction member 202, and further to the outside through the top cover 13. Further, the heat conduction member 202 is disposed at an end of the heat sink 20 and bends while extending. The heat conduction member 202 bends while extending to increase a heat dissipation area of the heat conduction member 202 and further improve the heat dissipation efficiency. In one embodiment, the heat sink 20 and the heat conduction member 202 may be integrally formed. The heat sink 20 and the heat conduction member 202 may be made of a same heat conducting material. The embodiments of the present disclosure do not specifically limit the heat conducting material, and any existing type of heat conducting material may be selected.

In one feasible implementation, the heat sink 20 is a heat equalizing plate. The heat conduction member 202 thereof is in the shape of a sheet. A surface of the sheet-shaped heat conduction member 202 contacts the top cover 13 to conduct the heat absorbed by the heat sink 20 to the outside of the enclosure 1. In one embodiment, the sheet-shaped heat conduction member 202 connects to the end of the heat sink 20.

To fix the heat sink 20 and the power supply battery 10, referring to FIG. 1, the power supply battery consistent with the embodiments of the present disclosure includes a plug-in member 101. The heat sink 20 includes an avoidance slot 201. The main control board 2 includes a mounting member. The plug-in member 101 passes through the avoidance slot 201 to be fixedly connected to the mounting member. As such, through the coupling of the plug-in member 101 and the mounting member, the power supply battery 10, the heat sink 20, and the main control board 2 are connected to become one whole piece. Through the fixing member on the rear part 12, the power supply battery 10 is fixed. Eventually, the power supply battery 10, the heat sink 20, and the main control board 2 all are fixed to the rear part 12, thereby preventing the power supply battery 10, the heat sink 20, and the main control board 2 from shaking inside the accommodation space. The plug-in member 101 and the mounting member may be fixedly connected by any existing connection method, such as snap connection and threaded connection, etc. It should be understood that the heat sink 20 and the power supply battery 10 may be fixedly connected in a manner other than the coupling of the plug-in member 101, the avoidance slot 201, and the mounting member described In some embodiments. Other methods of fixedly connecting the heat sink 20 and the power supply battery 10 together should be within the scope of present disclosure.

Referring back to FIG. 1, the gimbal handle 400 also includes an indicator 9 electrically connected to the main control board 2. The indicator 9 is used to indicate an operation status of the main control board 2. The indicator 9 may include one or more indicators. In one embodiment, the indicator 9 includes one indicator. The main control board 2, the gimbal electric motor 200 and the photographing device 300 mounted at the gimbal handle 400 all are powered by the power supply battery 10.

Specifically, after the power supply battery 10 supplies power to the main control board 2, the gimbal electric motor 200 and the photographing device 300 mounted at the gimbal handle 400, but before the gimbal electric motor 200 and the photographing device 300 mounted at the gimbal handle 400 become operational, the indicator 9 turns on steadily. After the power supply battery 10 supplies power to the main control board 2, the gimbal electric motor 200 and the photographing device 300 mounted at the gimbal handle 400, and the gimbal electric motor 200 and the photographing device 300 mounted at the gimbal handle 400 become operational, the indicator 9 blinks. When the power supply battery 10 does not supply the power, the indicator 9 turns off. Of course, the display mode of the indicator 9 is not limited to the above description, and specifically, the display mode of the indicator 9 may be configured as required.

With reference to FIG. 5 and FIG. 6, the present disclosure also provides a gimbal, including an arm 100, an electric motor 200 for driving the arm 100 to rotate, a photographing device 300 mounted at the arm 100, an adapter (not shown) for connecting to a terminal, and a gimbal handle 400. The structure, function, and operational principle and effect of the gimbal handle 400 may be referred to the previous description of the gimbal handle 400, and will not repeated herein.

The arm 100 or the electric motor 200 may be fixed to the enclosure 1. For example, in one embodiment, the housing of the electric motor 200 may be connected to the enclosure 1 through a quick release structure. In some embodiments, the gimbal is a three-axis gimbal. The arm 100 may include a pitch-axis arm, a roll-axis arm, or a yaw-axis arm. The electric motor 200 may include a pitch-axis electric motor, a roll-axis electric motor, or a yaw-axis electric motor, configured to drive the corresponding arm 100 to rotate. In other embodiments, the gimbal may also be a two-axis gimbal or a four-axis gimbal, etc.

The adapter is electrically connected to the electrical contact member 3 of the gimbal handle 400. Specific implementation may be referred to the previous description, and will not be repeated herein. The adapter and the terminal may be electrically connected in a plug-in manner or may be electrically connected in other manners. In some embodiments, the terminal may be rotatably connected to the adapter to adjust an angle of the terminal relative to the gimbal handle, thereby satisfying user's need for certain viewing angles. It should be noted that, in some embodiments, the adapter is not in the form of a wire, but may be used as a fixing member to fix the terminal to the gimbal handle 400.

In addition, in one embodiment, the photographing device 300 may be a camera or a photographing element composed of a lens and an image sensor (e.g., a CMOS or CCD sensor), etc., which may be specifically selected as required.

Referring to FIG. 1 and FIG. 3, the present disclosure provides another gimbal handle 400. The gimbal handle 400 includes an enclosure 1, a main control board 2, a power supply battery 10, and a heat sink 20. The enclosure 1 includes an accommodation space. The main control board 2, the power supply battery 10, and the heat sink 20 all are accommodated in the accommodation space. The power supply battery 10 is used to supply power to the main control board 2. The heat sink 20 is provided between the main control board 2 and the power supply battery 10. Moreover, one end of the heat sink 20 contacts the enclosure 1 to conduct the heat from the inside of the accommodation space to the outside of the accommodation space through the enclosure 1.

In some embodiments, the enclosure 1 may be assembled from several parts or may be an integral structure. For example, in one embodiment, the enclosure 1 includes a front part 11 and a rear part 12 coupled with the front part 11, and the front part 11 and the rear part 12 enclose to form an accommodation space. In another embodiment, the enclosure 1 includes a top part and a bottom part coupled with the top part, and the top part and the bottom part enclose to form an accommodation space. For illustration purpose, in some embodiments, the enclosure 1 includes the front part 11 and the rear part 12. In one embodiment, the front part 11 and the rear part 12 may be detachably connected with each other. Moreover, a sealed structure may be provided at the junction of the front part 11 and the rear part 12 to prevent external debris from entering the accommodation space.

In one embodiment, the enclosure 1 may be used as a handheld member or may be mounted at a movable platform.

Further, the enclosure 1 also includes a top cover 13 (i.e., the top) provided at the same side as the front part 11 and the rear part 12. The top cover 13 is used for the gimbal arm 100 or the gimbal electric motor 200 to be mounted thereto.

The top cover 13 is provided with a wiring hole 131. The wires drawn from the main control board 2 pass through the wiring hole 131 to be connected to the gimbal electric motor 200, such that the main control board 2 controls the rotation of the gimbal electric motor 200. In addition, after passing through the wiring hole 131, the wires drawn from the main control board 2 may also connect to a photographing device 300 mounted at the gimbal arm 100 to obtain and save the images photographed by the photographing device 300. After the main control board 2 obtains the images, the images may be played directly on the display screen 8 or may be transmitted to the terminal through the adapter, and the terminal may play and/or save the images. In addition, the main control board 2 may transmit the images to the SD card for storage.

Further, with reference to FIG. 1 and FIG. 3, the gimbal handle 400 also includes a power supply battery 10 accommodated in the accommodation space. The power supply battery 10 is used to supply power to the main control board 2. In one embodiment, the power supply battery 10 is provided between the main control board 2 and the rear part 12, such that the electrical contact member 3 and the connection member 4 are exposed through the front part 11.

Referring to FIG. 3, a fixing member is provided at the periphery of the rear part 12. The fixing member faces toward the accommodation space and is fixedly connected to the power supply battery 10. Fixing the power supply battery by the fixing member prevents the power supply battery 10 from shaking inside the accommodation space. Moreover, the fixing member that fixes the front part 11 is selected to fix the power supply battery 10 so that no additional fixing structure is needed to fix the power supply battery 10 to the rear part 12 and the weight of the gimbal handle 400 is reduced. In one feasible implementation, the fixing member is a clamping member. The clamping member faces toward the accommodation space and clamps the power supply battery 10. The clamping member clamps the front part 11 on the side away from the accommodation space. As such, both the power supply battery 10 and the front part 11 are fixed to the rear part 12 through the clamping member. It should be understood that the type of the fixing member is not limited by the present disclosure.

In some embodiments, the power supply battery 10 is a rechargeable battery. The rechargeable battery has a large capacity and a small size, thereby facilitating the miniaturization design of the gimbal handle 400.

With reference to FIG. 1 through FIG. 6, the main control board 2 also includes a charging interface. The charging interface is exposed at the bottom part, and the charging interface is electrically connected to the power supply battery 10. The power supply battery 10 may be connected to an external power supply through the charging interface, such that the power supply battery 10 is recharged.

Referring back to FIG. 1, the gimbal handle 400 also includes a heat sink 20 accommodated inside the accommodation space. The heat sink 20 is provided between the main control board 2 and the power supply battery 10, and the heat sink 20 directly contacts the enclosure 1. In one embodiment, one side of the heat sink 20 contacts electronic components on the main control board 2, and another side of the heat sink 20 contacts the power supply battery 10, such that the heat generated by the electronic components on the main control board 2 and the power supply battery 10 in operation is conducted to the outside of the enclosure 1. Thus, the heat dissipation is highly efficient.

In one embodiment, the heat sink 20 dissipates the heat generated by the main control board 2 and the power supply battery 10 through heat conduction to the outside of the enclosure 1. Specifically, in one embodiment, the heat sink 20 includes a heat conduction member 202. The heat conduction member 202 contacts the top cover 13 to dissipate the heat from the inside of the accommodation space to the outside of the accommodation space through the top cover 13. The heat conduction member 202 is coupled with the top cover 13 to improve the heat dissipation efficiency.

The heat sink 20 extends in a same direction as the power supply battery 10 extends to maximize the contact area between the heat sink 20 and the power supply battery 10. As such, most heat generated by the power supply battery 10 is conducted to the heat conduction member 202, and further to the outside through the top cover 13. Further, the heat conduction member 202 is disposed at the end of the heat sink 20 and bends while extending. The heat conduction member 202 bends while extending to increase a heat dissipation area of the heat conduction member 202 and further improve the heat dissipation efficiency. In one embodiment, the heat sink 20 and the heat conduction member 202 may be integrally formed. The heat sink 20 and the heat conduction member 202 may be made of a same heat conducting material. The embodiments of the present disclosure do not specifically limit the heat conducting material, and any existing type of heat conducting material may be selected.

In one feasible implementation, the heat sink 20 is a heat equalizing plate. The heat conduction member 202 thereof is in the shape of a sheet. The sheet-shaped heat conduction member 202 contacts the top cover 13 to conduct the heat absorbed by the heat sink 20 to the outside of the enclosure 1. In one embodiment, the sheet-shaped heat conduction member 202 connects to the end of the heat sink 20.

To fix the heat sink 20 and the power supply battery 10, referring to FIG. 1, the power supply battery 10 consistent with the embodiments of the present disclosure includes a plug-in member 101. The heat sink 20 includes an avoidance slot 201. The main control board 2 includes a mounting member. The plug-in member 101 passes through the avoidance slot 201 to be fixedly connected to the mounting member. As such, through the coupling of the plug-in member 101 and the mounting member, the power supply battery 10, the heat sink 20, and the main control board 2 are connected to become one whole piece. Through the fixing member on the rear part 12, the power supply battery 10 is fixed. Eventually, the power supply battery 10, the heat sink 20, and the main control board 2 all are fixed to the rear part 12, thereby preventing the power supply battery 10, the heat sink 20, and the main control board 2 from shaking inside the accommodation space. The plug-in member 101 and the mounting member may be fixedly connected by any existing connection method, such as snap connection and threaded connection, etc. It should be understood that the heat sink 20 and the power supply battery 10 may be fixedly connected in a manner other than the coupling of the plug-in member 101, the avoidance slot 201, and the mounting member as previously described. Other methods of fixedly connecting the heat sink 20 and the power supply battery 10 together should be within the scope of the present disclosure.

Other parts of the gimbal handle 400 may be referred to the previous description, and will not repeated herein.

With reference to FIG. 5 and FIG. 6, the present disclosure also provides a gimbal, including an arm 100, an electric motor 200 for driving the arm 100 to rotate, a photographing device 300 mounted at the arm 100, and a gimbal handle 400. The structure, function, and operational principle and effect of the gimbal handle 400 may be referred to the previous description of the gimbal handle, and will not repeated herein.

The arm 100 or the electric motor 200 may be fixed to the enclosure 1. For example, in one embodiment, the housing of the electric motor 200 may be connected to the enclosure 1 through a quick release structure. In some embodiments, the gimbal is a three-axis gimbal. The arm 100 may include a pitch-axis arm, a roll-axis arm, or a yaw-axis arm. The electric motor 200 may include a pitch-axis electric motor, a roll-axis electric motor, or a yaw-axis electric motor, configured to drive the corresponding arm 100 to rotate. In some other embodiments, the gimbal may also be a two-axis gimbal or a four-axis gimbal, etc.

In addition, in one embodiment, the photographing device 300 may be a camera or a photographing element composed of a lens and an image sensor (e.g., a CMOS or CCD sensor), etc., which may be specifically selected as required.

In the description of the present disclosure, "top," "bottom," "front," "rear," "left," and "right" should be understood as sequentially assembling the photographing device 300, the arm 100, and the gimbal handle 400 from top to bottom to form the directions of "top," "bottom," "front," "rear," "left," and "right" of the gimbal.

It should be understood that, in this specification, relational terms such as first and second are only used to distinguish one entity or operation from another entity or operation, and do not necessarily require or imply existence of the actual relationship or sequence among these entities or operations. The terms "include," "compose," or any other variants thereof are intended to cover non-exclusive inclusion, so that a process, a method, an article, or a device including a series of elements not only includes these elements, but also includes other elements not explicitly listed, or further includes elements inherent to the process, the method, the article, or the device. In absence of further restrictions, the element defined by the sentence "including a . . . " does not exclude the existence of other same elements in the process, the method, the article, or the device that includes the element.

The gimbal handle and the gimbal thereof provided by the embodiments of the present disclosure are described in detail. In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A gimbal handle comprising:
an enclosure including an accommodation space;
a main control board accommodated in the accommodation space;
an electrical contact member provided at the main control board and electrically connected to the main control board, the electrical contact member penetrating the enclosure to expose to an outside of the enclosure, and the electrical contact member being configured to be electrically connected to an adapter; and
a connection member provided at the main control board penetrating the enclosure to expose to the outside of the enclosure, the connection member being configured to be detachably connected to the adapter.

2. The gimbal handle according to claim 1, wherein:
the main control board includes a detection circuit;
the electrical contact member includes:
a first electrical contact member configured to be electrically connected to the adapter; and
a second electrical contact member connected to the detection circuit; and the detection circuit is configured to detect a conduction signal in response to the first electrical contact being electrically connected to the adapter.

3. The gimbal handle according to claim 1, wherein:
the connection member includes an elastic connection member configured to be plug-in fitted with the adapter.

4. The gimbal handle according to claim 1, wherein:
an external surface of the enclosure is provided with a slot configured to be detachably connected to the adapter; and
the electrical contact member and the connection member are inserted in and accommodated inside the slot.

5. The gimbal handle according to claim 4, wherein:
the slot includes an opening and a limit member provided opposite to the opening;
the opening is configured to allow the adapter to move from the opening to the limit member to be electrically connected to the electrical contact member and to be fixedly connected to the connection member; and
the limit member is configured to limit a movement of the adapter relative to the slot.

6. The gimbal handle according to claim 1, further comprising:
a display screen provided at the enclosure;
wherein the main control board includes a display driving circuit electrically connected to the display screen.

7. The gimbal handle according to claim 6, wherein:
the enclosure includes:
  a top part configured to be connected to a gimbal arm or a gimbal electric motor;
  a bottom part provided opposite to the top part; and
  a front part provided between the top part and the bottom part;
the electrical contact member, the connection member, and the display screen are located at the front part, the display screen being provided adjacent to the top part; and
the electrical contact member and the connection member are located at a side of the display screen away from the top part.

8. The gimbal handle according to claim 1, further comprising:
a controller provided at the enclosure and electrically connected to the main control board.

9. The gimbal handle according to claim 8, wherein:
the enclosure includes:
  a top part configured to be connected to a gimbal arm or a gimbal electric motor;
  a bottom part provided opposite to the top part; and
  a front part provided between the top part and the bottom part;
the electrical contact member and the connection member are located at the front part;
the display screen is provided adjacent to the top part; and
the electrical contact member and the connection member are located at a side of the controller away from the bottom part.

10. The gimbal handle according to claim 8, wherein:
the controller includes a power button and a shutter button.

11. The gimbal handle according to claim 1, further comprising:
a card slot provided at a side part of the enclosure and electrically connected to the main control board.

12. The gimbal handle according to claim 1, further comprising:
a power supply battery accommodated in the accommodation space and configured to supply power to the main control board;
wherein:
  the enclosure includes a front part and a rear part coupled with the front part, the front part and the rear part enclosing to form the accommodation space; and
  the power supply battery is provided between the main control board and the rear part.

13. The gimbal handle according to claim 12, wherein:
a fixing member is provided at a periphery of the rear part;
a side of the fixing member facing toward the accommodation space is fixedly connected to the power supply battery; and
another side of the fixing member away from the accommodation space is fixedly connected to the front part.

14. The gimbal handle according to claim 12, wherein:
the enclosure includes a top part configured to be connected to the gimbal and a bottom part provided opposite to the top part; and
the main control board further includes a charging interface exposed at the bottom part and electrically connected to the power supply battery.

15. A gimbal comprising:
an arm;
an electric motor configured to drive the arm to rotate;
a photographing device mounted at the arm;
an adapter configured to be connected to a terminal; and
a gimbal handle including:
  an enclosure including an accommodation space;
  a main control board accommodated in the accommodation space;
  an electrical contact member provided at the main control board and electrically connected to the main control board, the electrical contact member penetrating the enclosure to expose to an outside of the enclosure; and
  a connection member provided at the main control board penetrating the enclosure to expose to the outside of the enclosure, the connection member being configured to be detachably connected to the adapter;
wherein:
  the arm or the electric motor is fixed to the enclosure; and
  the adapter is electrically connected to the electrical contact member.

16. The gimbal according to claim 15, wherein:
the gimbal handle further includes a display screen provided at the enclosure; and
the main control board includes a display driving circuit electrically connected to the display screen.

17. The gimbal according to claim 16, wherein:
the enclosure includes:
  a top part configured to be connected to the gimbal arm or the gimbal electric motor;
  a bottom part provided opposite to the top part; and
  a front part provided between the top part and the bottom part;
the electrical contact member, the connection member, and the display screen are located at the front part;
the display screen is provided adjacent to the top part; and the electrical contact member and the connection member are located at a side of the display screen away from the top part.

18. The gimbal according to claim 15, wherein:
the gimbal handle further includes a controller provided at the enclosure and electrically connected to the main control board, the controller including a power button and a shutter button.

19. The gimbal according to claim 15, wherein:
the enclosure further includes a side part; and
the gimbal handle further includes a card slot provided at the side part and electrically connected to the main control board.

20. A gimbal handle comprising:
an enclosure including an accommodation space;
a main control board accommodated in the accommodation space;
an electrical contact member provided at the main control board and electrically connected to the main control board, the electrical contact member penetrating the enclosure to expose to an outside of the enclosure, and the electrical contact member being configured to be electrically connected to an adapter; and
a display screen provided at the enclosure;
wherein the main control board includes a display driving circuit electrically connected to the display screen.

* * * * *